United States Patent [19]

Lewis

[11] 4,042,189
[45] Aug. 16, 1977

[54] TAPE LEADER CHARACTERIZED BY DIFFERENTIAL BENDING STIFFNESS

[75] Inventor: Richard A. Lewis, Sherman Oaks, Calif.

[73] Assignee: Interdyne Company, Van Nuys, Calif.

[21] Appl. No.: 628,117

[22] Filed: Nov. 3, 1975

[51] Int. Cl.² .................. G03B 1/04; G11B 15/32
[52] U.S. Cl. ..................... 242/195; 156/191; 352/235; 352/237; 206/400
[58] Field of Search .............. 242/192, 195, 199, 181; 352/235, 237; 156/157, 176, 182, 73.2, 73.4, 191; 206/398, 400

[56] References Cited

U.S. PATENT DOCUMENTS

| | | | |
|---|---|---|---|
| 3,293,682 | 12/1966 | Giles | 15/210 |
| 3,620,893 | 11/1971 | Tarrson | 352/235 X |
| 3,675,877 | 7/1972 | Rempala | 242/209 |
| 3,695,553 | 10/1972 | Everett | 242/199 |
| 3,706,425 | 12/1972 | Deguchi et al. | 242/195 |
| 3,955,777 | 5/1976 | Burdorf | 242/192 |

Primary Examiner—Leonard D. Christian
Attorney, Agent, or Firm—William W. Haefliger

[57] ABSTRACT

A leader strip is connected with a tape at one end of the tape; and the leader strip has characteristic lengthwise unit bending stiffness which is substantially greater than leader characteristic widthwise unit bending stiffness. Further, the overall width of the leader typically exceeds the overall width of the tape, and the edge portions of the leader are engageable with non-grooved inner walls of reel flanges to be frictionally retained in position between the inner walls. A magnetic tape transport is provided with two such reels between which the tape and leader are transported.

16 Claims, 6 Drawing Figures

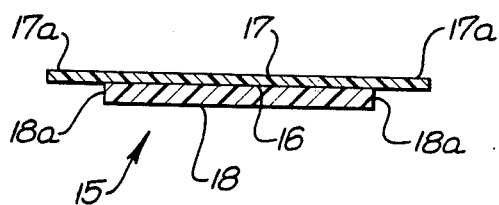
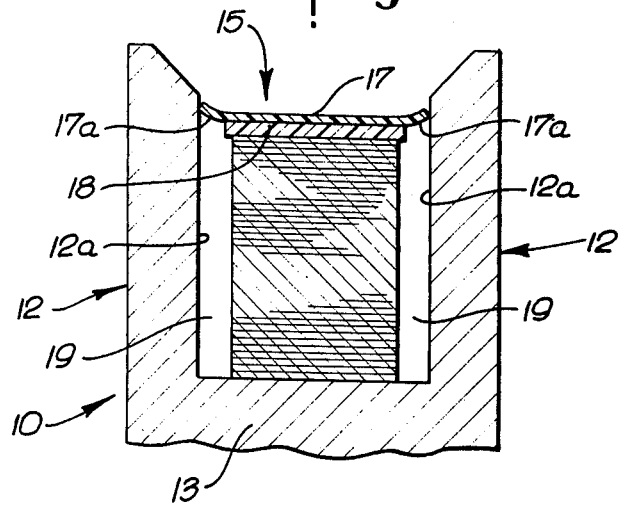
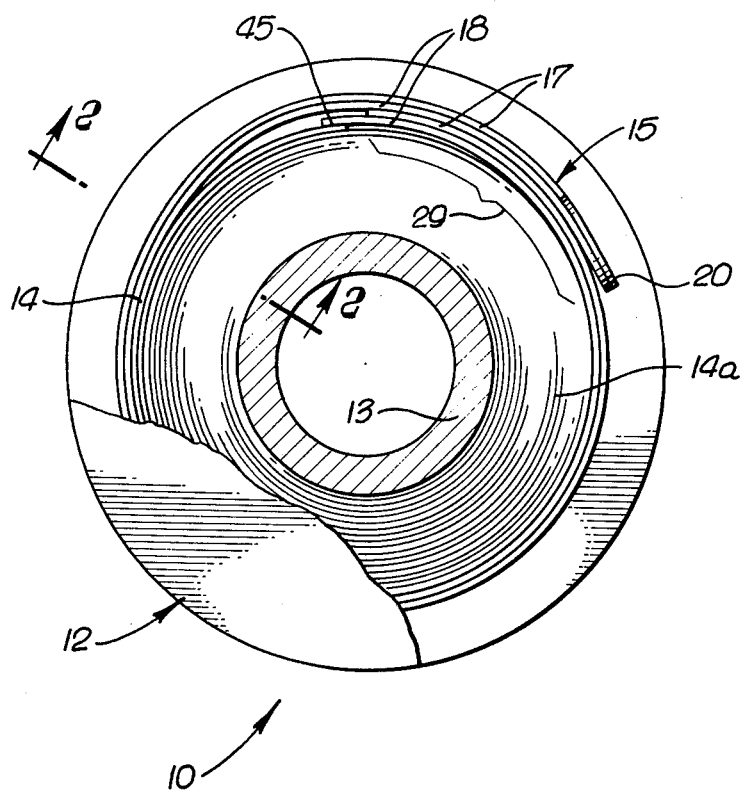
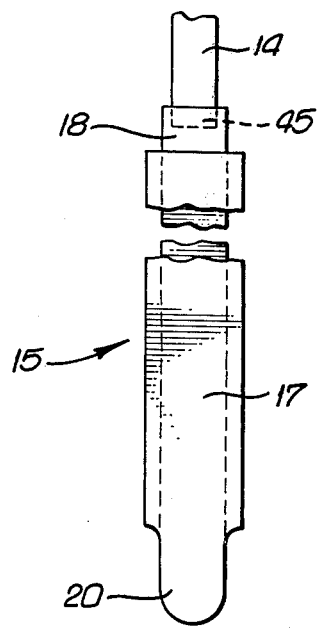

TAPE LEADER CHARACTERIZED BY DIFFERENTIAL BENDING STIFFNESS

BACKGROUND OF THE INVENTION

This invention relates generally to tape and/or film handling mechanism, and more particularly concerns the provision of simple, inexpensive containers and protective packages for magnetic tape and similar media.

It is desirable to protect tape wound on a reel by providing a protective leader strip which extends about the tape and is retained in position between reel flanges. One way to retain the leader requires the use of grooves cut in the flange walls to receive the leader edges; however, such grooves required exact tolerances since if they are too deep the leader will be loose and will not form a protective seal with the flanges; conversely, if the fit between the tape and grooves is too tight, it becomes unacceptably difficult to remove the leader from between the flanges.

Another expedient is to provide flexible reel flanges; however, they create additional problems in that the leader and tape are released or spilled if a flange flexes too far as can happen if the reel is dropped. Notched edge leader has also been employed; however, such leader does not completely seal off against the flanges so that the tape remains unprotected, i.e. one purpose of the leader is destroyed.

Further, if a leader is designed to frictionally engage straight (i.e. ungrooved) walls of the flanges, for retention, it is found that buckling of the leader occurs at random locations about the reel axis as the leader is wound, due to excessive bending stiffness of the leader, lengthwise. This leads to stripping difficulties and uneven winding of the tape about the leader on the take-up reel.

Inasofar as I am aware, no-one prior to the present invention has provided a solution to the above problems, which embodies the unusual structural features, function and results of the present invention.

SUMMARY OF THE INVENTION

It is a major object of the invention to provide a leader strip that, when combined with the tape, overcomes all of the above described difficulties and problems. Basically, the elongated leader strip of the invention is constructed or formed to have differential bending stiffness characterized, lengthwise and widthwise; for example, it has substantially greater characteristic lengthwise bending stiffness than it exhibits, widthwise. As a consequence, it can be made to frictionally cling to the reel inner walls to be retained in position to fully protect the tape; and at the same time, it is not so stiff, lengthwise, as to buckle at random locations during winding. Also, such a leader may be removed manually from between the reel flanges.

It is a further object of the invention to very simply achieve such an advantageous leader by providing medial portions which are thicker than the leader edge portions; for example, the leader strip may comprise two sub-strips which are interconnected in stacked or laminated relation, with edge portions defined by one sub-strip projecting laterally beyond the edges defined by another sub-strip. Further the sub-strips characteristically exhibit different bending moduli.

It is a further object of the invention to provide both supply and take-up reels designed to accept leaders and tape, as described, as well as to provide transports including such reels, leaders and tapes.

These and other objects and advantages of the invention, as well as the details of an illustrative embodiment will be more fully understood from the following description and drawings, in which:

DRAWING DESCRIPTION

FIG. 1 is an enlarged widthwise section taken through a leader strip incorporating the invention;

FIG. 2 is an enlarged fragmentary section taken on lines 2—2 of FIG. 3 through a reel for the FIG. 1 tape;

FIG. 3 is a side elevation of the reel;

FIG. 4 is a fragmentary plan view of an end portion of the FIG. 1 tape;

DETAILED DESCRIPTION

Figure 5:
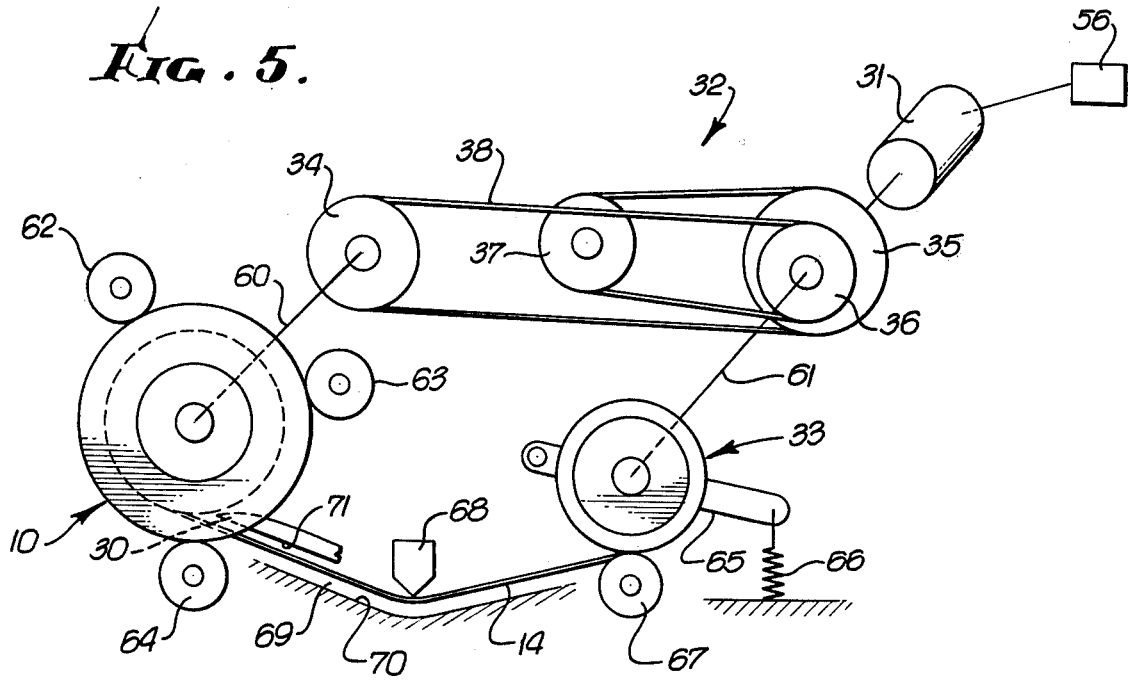
FIG. 5 is a schematic showing of a tape drive system.

In FIGS. 2 and 3, the tape storage or supply unit comprises a supply reel 10 having an axis 11, spaced flanges 12 extending in planes normal to axis 11, and a hub 13 about which stored magnetic tape 14 is wound in a spiral pack 14a between the flanges. The tape width is less than the width of the space between the flange inner walls 12a, there being clearance 19 between the tape and walls, as shown.

A thin, elongated leader strip 15 is connected with the tape at one end thereof, the leader strip having a characteristic lengthwise unit bending stiffness which is substantially greater than its characteristic widthwise unit bending stiffness, insofar as its functional cooperation with adaptation to the reel is concerned. While the leader strip may take various forms to meet these differential stiffness requirements, one unusually advantageous construction comprises two sub-strips which are shown as interconnected in stacked relation. For example, the sub-strips may be adherent at their interface 16 as by heat bonding or other type bonding. Edge portions 17a of sub-strip 17 typically project laterally beyond the edges 18a of sub-strip 18 so as to flex as in the manner depicted in FIG. 2 when engaged with reel walls 12a. Accordingly, the medial portions of the strip 15 (which include sub-strip 18) are thicker than the strip outermost edge portion 17a. Sub-strip 17 may consist of vinyl (less stiff) material, and sub-strip 18 of Mylar (relatively greater stiffness) these being examples which meet the physical requirements of the invention. Accordingly, the sub-strips have different bending moduli.

When the leader strip is protectively wound about the tape and feeds between the flanges, the edge portions 17a engage the groove-free walls 12a of the flanges and flex or deflect, as referred to, with relatively greater compliance than is exhibited by the overall strip 15 in bending longitudinally about axis 11 to come to rest as in FIG. 3. Accordingly, while the strip is positively held in wound position by the frictional engagement of flexed end portions 17a with the groove-free walls 12a, the leader is sufficiently stiff, lengthwise, to self-feed between guide walls 70 and 71 and through channel 69, as the leader unwinds off the reel and is directed toward take-up reel 33 seen in FIG. 5. In this regard, note in FIG. 3 that the leader strip 15 is of sufficient length to extend completely about the tape, and overlap itself at 29; also, a tail end of the strip, as provided at 20, is narrower than the overall width of the main length of the strip, to project between the walls 12a free of engagement therewith, so as to be easily grasped or stripped. A stripper finger appears at 30 in FIG. 5. The tape pack 14a is completely sealed off from the exterior, in FIG. 3.

Additional structure shown in FIG. 5 includes a single motor 31 and a belt drive system 32 operatively connected between the motor and the two reels 10 and 33. Note the use of pulleys 34–37 entraining the single belt 38, as described in my co-pending U.S. pat. application Ser. No. 563,292, filed Mar. 31, 1975 and now abandoned. When take-up reel 33 is rotated counterclockwise, its angular velocity will be greater than that of supply reel 10; and when reel 10 is rotated clockwise, its angular velocity will be greater than that of reel 33, as described in that prior application.

Figure 6:
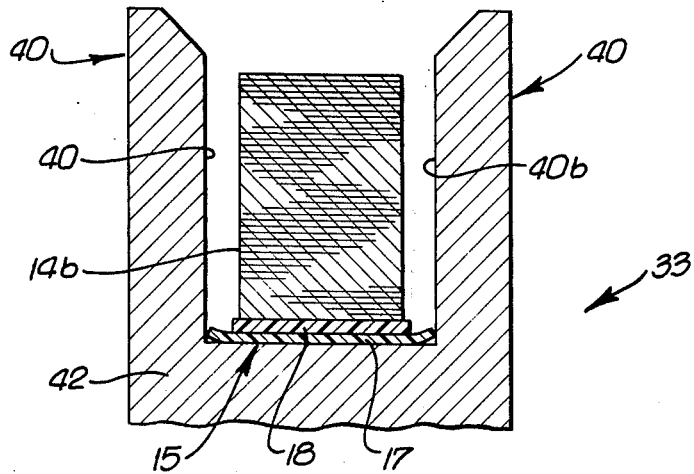
FIG. 6 is a view like FIG. 7, but showing a take-up reel construction.

The reel 33 may have the construction as seen in FIG. 6, wherein the tape is wound at 14b between walls 40a of flanges 40; and the leader edge portions frictionally engage walls 40b near the hub 42. The walls 40 have lateral spacing approximately the same as walls 12a in FIG. 2. Accordingly, the reels 10 and 37 may be alike. Control means 56 connected with the motor may include amplifier, switches, and associated circuitry including encoding means.

FIG. 4 also shows the splicing of the magnetic tape 14 to the leader strip 15, as at zone 45; thus, the tape may be spliced to sub-strip 18, as shown.

Returning to FIG. 5, shafts 60 and 61 connect the pulleys 34 and 35 with the respective reels 10 and 33. Rotors 62–64 engage the periphery of reel 10 to locate it. A pivoted arm 65 supports reel 33, and a spring 66 urges the arm to urge reel 33 toward rotor 67 engaging the reel periphery. The transported tape 14 passes adjacent the read/write head 68. The leader and tape guide channel 69 is formed between guide walls 70 and 71, to conduct the leader past the head, for self-feeding toward the reel 33, in the manner as described in my prior application as referred to. Other structures may be provided to locate and rotate the reels 10 and 33, as in my prior application referred to above.

I claim:

1. In combination,
   a. an elongated tape, and
   b. an elongated leader strip connected with the tape at an end portion thereof, and projecting both widthwise and length-wise free of the tape at lateral edge portions of the strip,
   c. said lateral edge portions of the strip projecting laterally throughout their extent parallel to a plane defined by the main portion of said tape proximate the strip,
   d. said leader strip having characteristic lengthwise unit bending stiffness which is substantially greater than leader characteristic width-wise unit bending stiffnes at said lateral edge portions of the tape proximate the strip.

2. The combination of claim 1 wherein the tape consists of magnetic tape.

3. The combination of claim 1 wherein the leader strip has medial portions and edge portions, the medial portions being thicker than the outermost edge portions, the medial and edge portions projecting beyond the end of the tape.

4. In combination:
   a. an elongated tape, and
   b. an elongated leader strip connected with the tape at an end thereof, the strip comprising at least two sub-strips which are interconnected in stacked relation, edge portions defined by one sub-strip projecting laterally beyond the edges defined by another sub-strip, the leader strip projecting both widthwise and lengthwise free of the tape,
   c. said leader strip having characteristic lengthwise unit bending stiffness which is substantially greater than leader characteristic widthwise unit bending stiffness at said edge portions of the one sub-strip.

5. In combination:
   a. an elongated tape, and
   b. an elongated leader strip connected with the tape at an end thereof, the strip comprising at least two sub-strips which are interconnected in stacked relation, edge portions defined by one sub-strip projecting laterally beyond the edges defined by another sub-strip,
   c. said leader strip having characteristic lengthwise unit bending stiffness which is substantially greater than leader characteristic widthwise unit bending stiffness at said edge portions of the one sub-strip,
   d. the two sub-strips having different bending moduli.

6. In combination:
   a. an elongated tape, and
   b. an elongated leader strip connected with the tape at an end thereof, the strip comprising at least two sub-strips which are interconnected in stacked relation, edge portions defined by one sub-strip projecting laterally beyond the edges defined by another sub-strip,
   c. said leader strip having characteristic lengthwise unit bending stiffness which is substantially greater than leader characteristic widthwise unit bending stiffness at said edge portions of the one sub-strip,
   d. the one sub-strip consisting of vinyl and the other sub-strip consisting of Mylar.

7. In combination:
   a. an elongated tape, and
   b. an elongated leader strip connected with the tape at an end portion thereof, and projecting both widthwise and lengthwise free of the tape,
   c. said leader strip having characteristic lengthwise unit bending stiffness which is substantially greater than leader characteristic widthwise unit bending stiffness at lateral edge portions of the strip,
   d. and including a reel having a hub about which the tape is wound, the reel having flanges engaged by edge portions of the leader so as to frictionally retain the leader therebetween with the leader extending protectively about the wound tape.

8. In a tape storage unit, the combination comprising
   a. a reel having an axis, axially spaced flanges extending generally normal to said axis, and a hub about which the tape is wound for storage between the flanges,
   b. an elongated leader strip connected with the tape, the overall width of the leader strip exceeding the overall width of the tape,
   c. the leader strip having edge portions and medial portions between the edge portions, the leader strip having characteristic lengthwise unit bending stiffness which is substantially greater than leader widthwise unit bending stiffness at said edge portions, the edge portions projecting freely widthwise for engaging said flanges to be frictionally retained in position therebetween and to continuously seal off against said flanges about the reel axis to protect the tape.

9. The combination of claim 8 wherein the flanges have inner walls engaged by and deflecting said edge portions.

10. The combination of claim 8 wherein said inner walls are free of grooves sunk therein, and the leader strip extends substantially completely about the tape wound on the hub.

11. The combination of claim 10 wherein the leader strip medial portions are thicker than the leader strip edge portions.

12. In a tape storage unit, the combination comprising
   a. a reel having an axis, axially spaced flanges extending generally normal to said axis, and a hub about which the tape is wound for storage between the flanges,
   b. an elongated leader strip connected with the tape, the overall width of the leader strip exceeding the overall width of the tape,
   c. the leader strip having edge portions and medial portions between the edge portions, the medial portions being thicker than the edge portions, the edge portions engaging said flanges to be frictionally retained in position therebetween,
   d. the flanges having inner walls engaged by and deflecting said edge portions, said inner walls being free of grooves sunk therein, and the leader strip extending substantially completely about the tape wound on the hub, the strip comprising at least two sub-strips which are interconnected in stacked relation, said edge portions defined by one sub-strip and projecting laterally beyond edge portions defined by another sub-strip.

13. The combination of claim 12 wherein the sub-strips have different bending moduli.

14. In a tape transport that includes
   a. first and second tape reels each having an axis, a hub and spaced flanges projecting normal to said axis and radially outwardly of the hub,
   b. magnetic tape wound about one of the hubs and a leader strip connected with the tape, the lateral width of the leader strip being greater than the tape lateral width, the lateral edges of the leader strip being deflected by and sealing against inner walls defined by the flanges of one reel to protect the tape,
   c. means mounting the reels for rotation in spaced apart relation, and
   d. guide means for guiding leader strip and tape travel between the reels, and the improvement comprising
   e. said leader strip having characteristic lengthwise bending stiffness which is substantially greater than leader characteristic widthwise bending stiffness proximate said edges.

15. The transport of claim 14 wherein the leader strip has laterally opposite edge portions and medial portions located between said edge portions, the medial portions being thicker than the edge portions.

16. The transport of claim 14 wherein flanges of each reel have inner walls free of grooves sunk therein.

* * * * *